(12) United States Patent
Southward et al.

(10) Patent No.: US 9,645,035 B1
(45) Date of Patent: May 9, 2017

(54) IMPARTING MOTION TO A TEST OBJECT SUCH AS A MOTOR VEHICLE IN A CONTROLLED FASHION WITH IMPROVED ACCURACY

(71) Applicants: Roehrig Engineering, Inc., Lexington, NC (US); Virginia Tech Intellectual Properties, Inc., Blacksburg, VA (US)

(72) Inventors: Stephen C. Southward, Danville, VA (US); Chandler Reubush, Toano, VA (US); Bryan Pittman, Thomasville, NC (US); Kurt Roehrig, Lexington, NC (US); Doug Gerard, Gillette, WY (US)

(73) Assignees: Roehrig Engineering, Inc., Lexington, NC (US); Virginia Tech Intellectual Properties, Inc., Blackburg, VA (US)

( * ) Notice: Subject to any disclaimer, the term of this patent is extended or adjusted under 35 U.S.C. 154(b) by 360 days.

(21) Appl. No.: 14/331,696

(22) Filed: Jul. 15, 2014

Related U.S. Application Data

(62) Division of application No. 13/280,532, filed on Oct. 25, 2011, now Pat. No. 8,844,345.

(60) Provisional application No. 61/406,280, filed on Oct. 25, 2010, provisional application No. 61/416,825, filed on Nov. 24, 2010.

(51) Int. Cl.
*G01M 17/04* (2006.01)
*G01L 25/00* (2006.01)
*G01L 1/00* (2006.01)

(52) U.S. Cl.
CPC .............. *G01L 25/00* (2013.01); *G01L 1/00* (2013.01)

(58) Field of Classification Search
USPC .... 73/117.01, 117.02, 117.03, 146, 669, 670
See application file for complete search history.

(56) References Cited

U.S. PATENT DOCUMENTS

| | | | |
|---|---|---|---|
| 3,815,404 A | 6/1974 | Brisard | 73/11.08 |
| 3,827,289 A | 8/1974 | Borg | 73/71.7 |
| 3,916,677 A | 11/1975 | Isley et al. | 73/669 |
| 4,335,867 A | 6/1982 | Bihlmaier | 251/28 |

(Continued)

OTHER PUBLICATIONS

"The PemRam™—an electromagnetic linear actuator," P.R.M. Denne, Denne Developments, copyright 1996; The Institution of Electrical Engineers.

(Continued)

*Primary Examiner* — Eric S McCall
(74) *Attorney, Agent, or Firm* — MacCord Mason PLLC

(57) ABSTRACT

An apparatus imparts motion to a test object such as a motor vehicle in a controlled fashion. A base has mounted on it a linear electromagnetic motor having a first end and a second end, the first end being connected to the base. A pneumatic cylinder and piston combination have a first end and a second end, the first end connected to the base so that the pneumatic cylinder and piston combination is generally parallel with the linear electromagnetic motor. The second ends of the linear electromagnetic motor and pneumatic cylinder and piston combination being commonly linked to a mount for the test object. A control system for the linear electromagnetic motor and pneumatic cylinder and piston combination drives the pneumatic cylinder and piston combination to support a substantial static load of the test object and the linear electromagnetic motor to impart controlled motion to the test object.

5 Claims, 13 Drawing Sheets

(56) References Cited

U.S. PATENT DOCUMENTS

| | | | | |
|---|---|---|---|---|
| 4,658,656 | A | 4/1987 | Haeg | 73/669 |
| 4,733,558 | A | 3/1988 | Grenier | 731/115.07 |
| 4,768,374 | A | 9/1988 | Fouchey | 73/115.07 |
| 4,855,702 | A | 8/1989 | Swanson et al. | 335/261 |
| 4,981,034 | A | 1/1991 | Haeg | 73/118.01 |
| 5,056,024 | A | 10/1991 | Stuyts | 364/424.03 |
| 5,253,619 | A | 10/1993 | Richeson et al. | 123/90.12 |
| 5,369,974 | A | 12/1994 | Tsymberov | 73/11.08 |
| 5,487,301 | A | 1/1996 | Müller et al. | 73/118.1 |
| 5,540,099 | A | 7/1996 | Harashima | 73/669 |
| 5,610,330 | A | 3/1997 | Fricke et al. | 73/146 |
| 5,661,446 | A | 8/1997 | Anderson et al. | 335/229 |
| 5,665,901 | A | 9/1997 | Ilzig et al. | 73/11.08 |
| 6,369,974 | B1 | 4/2002 | Asgari et al. | 360/78.14 |
| 6,386,025 | B2 | 5/2002 | Alexander | 73/146 |
| 6,468,082 | B1 | 10/2002 | Denne | 434/55 |
| 6,573,630 | B2 | 6/2003 | Morita | 310/181 |
| 6,786,074 | B1 | 9/2004 | Campuzano | 73/11.04 |
| 6,942,202 | B2 | 9/2005 | Kienholz | 267/140.14 |
| 7,051,850 | B2 | 5/2006 | Kienholz | 188/267 |
| 7,146,859 | B2 | 12/2006 | Dittmann et al. | 73/669 |
| 7,266,993 | B2 | 9/2007 | Strand et al. | 73/49.2 |
| 7,401,520 | B2 | 7/2008 | Parison | 73/669 |
| 7,461,556 | B2 | 12/2008 | Hamilton | 73/669 |
| 7,478,470 | B2 | 1/2009 | Mogck et al. | 29/564.1 |
| 7,971,486 | B2 | 7/2011 | Melz et al. | 73/669 |
| 8,302,460 | B2 | 11/2012 | Foss et al. | 73/28.01 |
| 2001/0045125 | A1 | 11/2001 | Alexander | 73/146 |
| 2002/0066302 | A1 | 6/2002 | Hamm et al. | 73/1.13 |
| 2002/0144543 | A1* | 10/2002 | Rothoff | B60G 17/01908 73/117.03 |
| 2008/0229836 | A1 | 9/2008 | Melz et al. | 73/669 |
| 2010/0060393 | A1 | 3/2010 | Joo et al. | 335/180 |
| 2010/0107738 | A1 | 5/2010 | Foss et al. | 73/28.01 |
| 2010/0192667 | A1 | 8/2010 | Friedman et al. | 73/12.06 |
| 2013/0042980 | A1 | 2/2013 | Sotgiu | 157/1.24 |

OTHER PUBLICATIONS

"Linear Electromagnetic Actuators and their Control: a Review," Boldea, EPE Journal, vol. 14, n. 1, Feb. 2004.

"Development of a General Use Quarter-Vehicle Test Rig," Langdon and Southward, ASME, 2007.

4K Electro-Magnetic Actuator information, listed on Roehrig Engineering, Inc. website at least as early as Feb. 24, 2009.

"The distinguishing features of the ServoRam and its performance advantages," pp. 1-9, Advanced Motion Technologies, Inc., copyright 1998-2001.

\* cited by examiner

IMPARTING MOTION TO A TEST OBJECT SUCH AS A MOTOR VEHICLE IN A CONTROLLED FASHION WITH IMPROVED ACCURACY

This application is a divisional of and claims the benefit of application Ser. No. 13/280,532 filed Oct. 25, 2011, and the Oct. 25, 2010 filing date of provisional application 61/406,280 and the benefit of the Nov. 24, 2010 filing date of provisional application 61/416,825.

BACKGROUND OF THE INVENTION

The present invention deals with imparting motion to a test object such as a motor vehicle in a controlled fashion; apparatus and methods are involved.

Known vehicle shakers usually have hydraulic wheel loader actuators which sometimes have an additional piston/cylinder in parallel with the hydraulic piston/cylinder to provide a "load bias" capability. This additional parallel cylinder uses gas such as nitrogen with a simple control system to provide static loads, thereby reducing the burden from the hydraulics. Such actuators are commonly used in 4-post and 7-post vehicle shaker rigs. The industry standard for 7-post shaker rigs is to use three hydraulic body loaders with integral "compliance link" elements in addition to four hydraulic wheel loaders. Body loaders are also referred to as aeroloaders or downforce actuators. The compliance link is essentially a soft spring in series with the hydraulics. Some body loader designs use pneumatic actuation instead of hydraulics, based on a belief that the pneumatic cylinder would naturally act as a soft spring to provide performance equivalent to the industry standard, but less expensive to operate. However, such pneumatic body loader technology does not have enough control bandwidth to meet the needs of a typical 7-post or 8-post test. The industry standard hydraulic body loader solution has a higher bandwidth, but it also suffers from bandwidth limitations that are created by the presence of the "compliance link."

SUMMARY OF THE INVENTION

The present invention fulfills one or more of these needs in the art by providing an apparatus for imparting motion to a test object such as a motor vehicle in a controlled fashion including a base, at least one linear electromagnetic motor having a first end and an second end, the first end being connected to the base, at least one pneumatic cylinder and piston combination having a first end and a second end, the first end connected to the base so that the pneumatic cylinder and piston combination is generally parallel with the linear electromagnetic motor, the second ends of the linear electromagnetic motor and pneumatic cylinder and piston combination being commonly linked to a mount for the test object, and a control system for the linear electromagnetic motor and pneumatic cylinder and piston combination that drives the pneumatic cylinder and piston combination to support a substantial static load imparted to the test object, enabling the linear electromagnetic motor to provide controlled motion to the test object.

The first end of the apparatus is typically fixedly attached to an inertial ground reference.

In some embodiments both ends of the apparatus allow angular motion relative to the respective attachment points.

The apparatus may contain at least one temperature sensing means for monitoring and/or regulating the temperature of the linear electromagnetic motor. The apparatus may include at least one cooling means for cooling the linear electromagnetic motor. The cooling means include a forced air convection supplied by an external air pressure source. An automatic or a manual means of regulating the temperature of the linear electromagnetic motors may be used.

Preferably, the apparatus includes an installation means for enabling safe attachment of the mount to the test object. The installation means may restrict angular motion of the apparatus relative to the inertial ground reference. The installation means may use the second actuation means to slowly extend or retract the moving end of the apparatus to facilitate safe attachment. The installation means may include a manual lever to slowly adjust the position of the second end of the apparatus.

One preferred embodiment of the apparatus includes at least one force sensing element to provide a signal indicative of the force applied to the test object. The force sensing element may be connected in a feedback circuit to the control system to regulate the desired or specified static force imparted by the pneumatic cylinder and piston combination. The force sensing element may be connected in a feedback circuit to the control system to regulate the desired or specified dynamic force imparted by the linear electromagnetic motor.

Another preferred embodiment of the apparatus includes at least one displacement sensing element to provide a signal indicative of the linear displacement between the first end and the second end. The displacement sensing element may be connected in a feedback circuit to the control system to regulate the desired or specified static displacement. The displacement sensing element may be connected in a feedback circuit to the control system to regulate the desired or specified dynamic displacement.

Some embodiments of the apparatus may simultaneously include at least one force sensing element and at least one displacement sensing element.

In some embodiments, a plurality of the apparatuses described above are used to simultaneously impart controlled motion to multiple points of a test object. A feedback control system may be included to regulate the forces and or displacements imparted by the plurality of apparatuses.

The apparatus may include a means for disabling power to an apparatus element in the event that an unsafe condition has been determined. The apparatus may include a means for notifying the feedback control system in the event that an apparatus element enters into an unsafe condition. The apparatus may include a means for enabling power to an apparatus element such that impulsive forces are not input to the test object.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

The term "body loader" is generically used to refer to an apparatus that can impart controlled energy (forces and displacements) into a test object substantially along one axis while minimizing motion constraints along the other two orthogonal axes. Body loaders are also known as a "downforce actuators" or "aeroloaders", however, those teims are somewhat restrictive. Such devices are used in 7-post and 8-post vehicle shaker rigs to simulate aerodynamic and inertial loads applied to the chassis or body of a ground vehicle.

The term "wheel loader" is generically used to refer to an apparatus that can impart controlled energy (forces and displacements) into a test object substantially along one axis while substantially constraining motion along the other two orthogonal axes. Such devices are used in 7-post and 8-post vehicle shaker rigs to simulate road inputs to the tires or wheel hubs of a ground vehicle.

Figure 1:
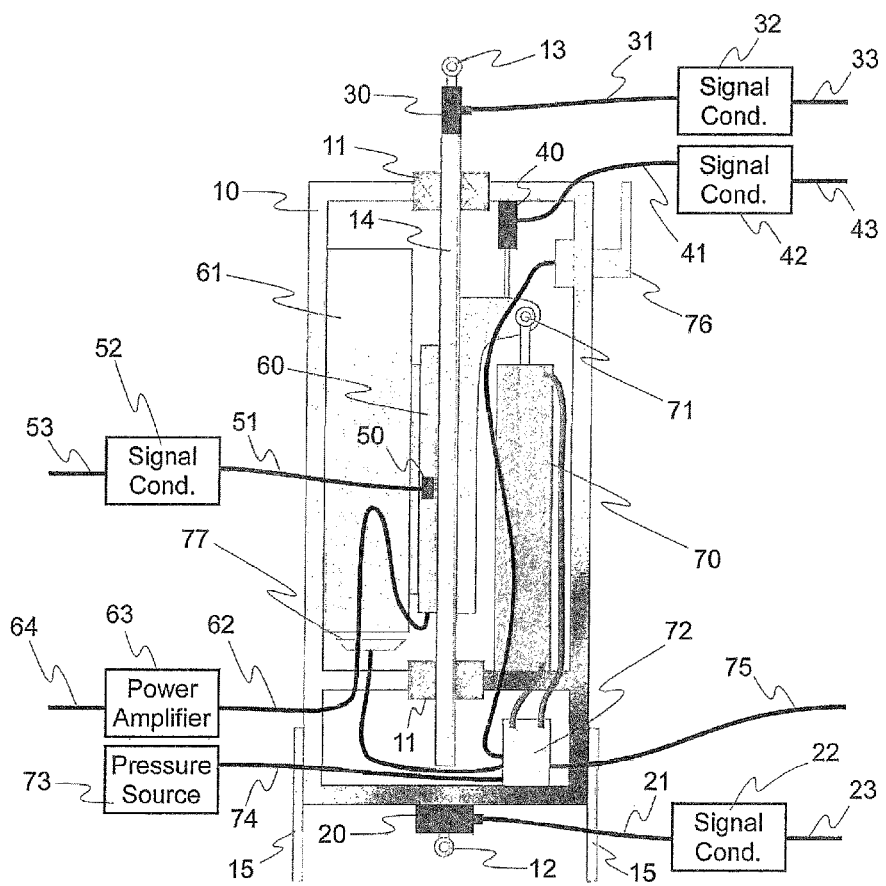
FIG. 1 is a schematic diagram of one single body loader apparatus incorporating at least one linear electromagnetic motor and at least one pneumatic cylinder and piston combination.

FIG. 1 is a schematic diagram of one single body loader apparatus based on Electro-Magnetic Actuation (EMA) technology. A rigid housing 10 provides a base of support for the moving member 14 with an integral shaft. The moving member is constrained to allow relative linear motion provided by bearings 11 attached to the rigid housing 10. To maximize body loader performance, it is necessary for the moving member 14 to be as lightweight as possible. The base of the body loader, which is also called the "stationary" or first end, is fixedly attached to an inertial ground reference through stationary attachment means 12. For the body loader embodiment, the stationary attachment means 12 must allow angular motion of the rigid housing 10 relative to the inertial ground reference. Also for the body loader embodiment, the moving end of the body loader is fixedly attached to the test object through moving attachment means 13. Moving attachment means 13 must allow angular motion of the moving member 14 relative to the test object. Both attachment means 12 and 13 must have a very limited "rattlespace" such as what can be achieved with a high compression ball joint.

As seen in FIG. 1, the apparatus includes an installation support means 15 for restricting angular motion of the rigid housing 10 relative to the inertial ground reference during the installation process while the moving attachment 13 is being connected to the test object. Preferably, the installation support means 15 allows some degree of manual adjustment to enable the rigid housing 10 to be positioned over a range of possible angles relative to the inertial ground reference.

FIG. 1 shows that the apparatus contains at least one linear electromagnetic motor to impart controlled dynamic and static actuation forces to the test object. The linear electromagnetic motor is made up of at least one coil element 60 fixedly attached to the moving member 14, and at least one U-shaped permanent magnet track 61 fixedly attached to the rigid housing 10. Alternative linear electromagnetic motor designs may use electromagnets to replace or supplement permanent magnets. At least one power amplifier 63 delivers controlled current to the at least one coil element 60 through the at least one wiring harness 62 in response to a command voltage 64. Alternative power amplifier designs may deliver controlled voltage to the at least one coil element 60.

The apparatus of FIG. 1 contains at least one secondary actuation means 70 in parallel with the linear electromagnetic motor to impart controlled static forces to the test object. The at least one secondary actuation means 70 must be capable of generating static loads, but it must also be relatively compliant to accommodate dynamic motions. The preferred at least one secondary actuation means 70 is a pneumatic cylinder and piston assembly. The base end of the at least one secondary actuation means 70 is fixedly attached to the rigid housing 10, and the moving end of the at least one secondary actuation means 70 is fixedly attached to the moving member 14 at attachment 71. A controllable valve 72 is mounted on or near the rigid housing 10. Controllable valve 72 is supplied with pressurized gas through supply line 74 from an external pressure source 73. The pneumatic valve 72 is responsive to control input 75 from a control system and/or from manual input means 76 mounted on or near the rigid housing. Manual input means 76 provides a means for slowly adjusting the position of the moving attachment means 13 so that it may safely be connected to the test object. The safe attachment is aided by the use of a proportional valve and poppet to allow control of the pneumatic cylinder while manipulating it manually.

Figure 11:
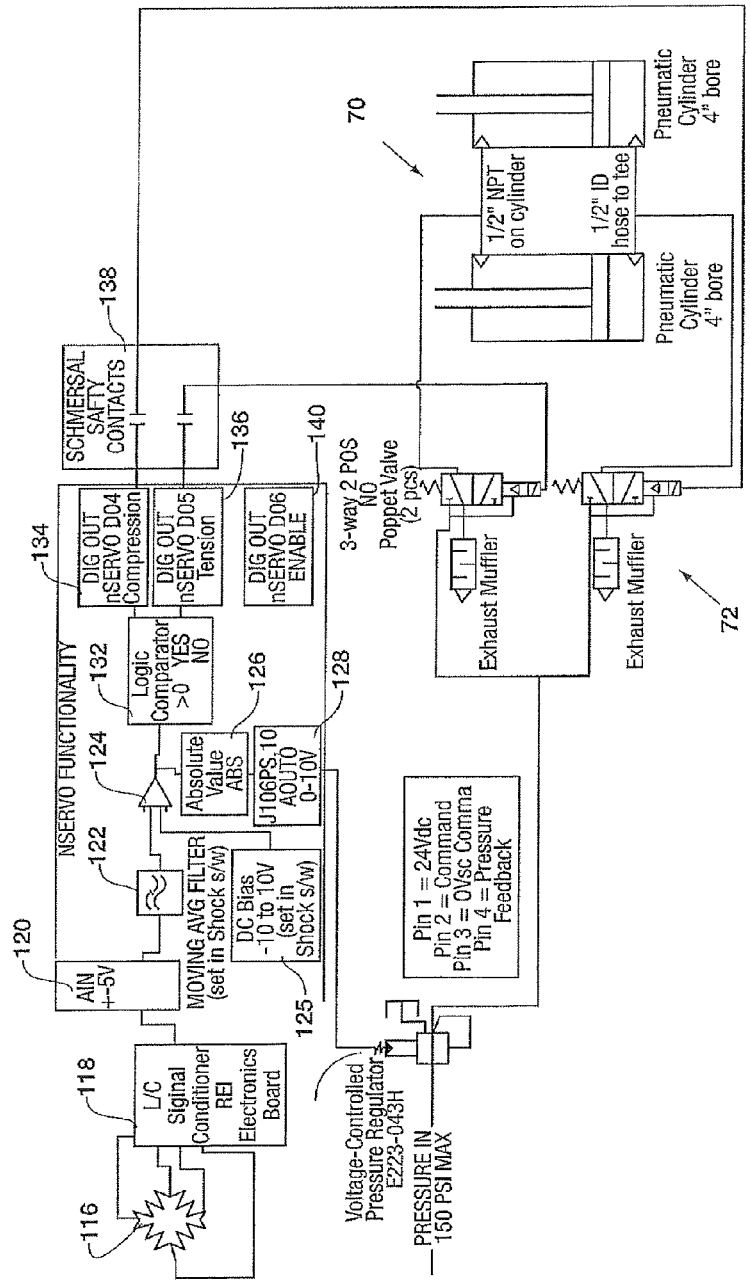
FIG. 11 is a block diagram of a pneumatic circuit useable with the body loader and/or wheel loader.

FIG. 11 shows a schematic diagram of a control circuit for the pneumatics. The load cell 116 outputs a signal to the load cell signal conditioner 188 that raises the voltage output from the millivolt range to +/−5 volts. That signal is applied to a moving average filter 122 and its output is applied to a comparator 124 that also receives a dc bias voltage from voltage source 125. The output of the comparator is a binary signal indicating if the load is positive or negative. That signal is applied to a logic comparator 132 that outputs a signal to DIG OUT nServo 134 if compression is needed and to DIG OUT nServo 136 if tension is needed. That selection is applied to an optional status display 140 and also through safety contacts 138 to the valves 72 for the pressurized air supply that control the supply of pressurized air to the pneumatic cylinder 70. This circuit branch thus controls the direction of pressurized air application The output of the comparator 124 is also applied to a component 126 that takes the signal's absolute value and applies it through pressure control component 128 to get a force magnitude signal that is applied to a voltage controlled pressure regulator 130 to affect the pressure applied though the valves 72 to the cylinder 70. This circuit branch enables the magnitude of the pressure application to be controlled.

The apparatus typically has at least one cooling means 77 for cooling the at least one coil element 60. An example of a cooling means is forced convection using a gallery, header or air knife which directs a sheet of air through the air gap between the at least one coil element 60 and the permanent magnet track 61. Water, or some other fluid, may be used as an alternative at least one cooling means.

Preferably, the apparatus contains at least one temperature sensing means 50 for monitoring and/or regulating the temperature of the at least one coil element 60. A temperature sensor wiring harness 51 transmits an electrical signal to an external signal conditioning unit 52 which generates a coil temperature signal 53 indicative of the actual coil element temperature.

As seen in FIG. 1, one preferred embodiment of the apparatus includes at least one force sensing means 30 to measure the dynamic and static force applied to the test object. In this embodiment, the apparatus is used to create controlled forces imparted to the test object, and the at least one force sensing means 30 is preferably located as close as possible to the moving attachment means 13. A force sensing wiring harness 31 transmits an electrical signal to a signal conditioning unit 32 which generates a transmitted force signal 33 indicative of the actual force transmitted through the at least one force sensing means 30.

In a second embodiment of the apparatus, a secondary force sensing means 20 is located near the stationary attachment means 12. The secondary force sensing means 20 also measures the static and dynamic force applied to the test object; however, when the apparatus is vertically oriented, the secondary force sensing means 20 also measures the static weight of the stationary portion of the apparatus. A secondary force sensing wiring harness 21 transmits an electrical signal to a signal conditioning unit 22 which generates a secondary transmitted force signal 23 indicative of the actual force transmitted through the secondary force sensing means 20.

With respect to FIG. 1, one preferred embodiment of this apparatus includes a relative displacement sensing means 40 to measure the displacement between the rigid housing 10 and the moving member 14. A relative displacement sensing wiring harness 41 transmits an electrical signal to a signal conditioning unit 42 which generates a relative displacement signal 43 indicative of the actual displacement between the rigid housing 10 and the moving member 14. In one embodiment of the apparatus, the relative displacement signal 43 can be used in a feedback control system to regulate the position of the movable member 14. In this particular embodiment of the apparatus, the transmitted force signal 33 is not used in a feedback control system. The relative displacement signal 43 can also be used as a measure of the displacement of the test object relative to the inertial ground reference. In a preferred embodiment of this invention, a plurality of body loader apparatus elements are attached to a test object to simultaneously impart controlled energy at multiple points.

Figure 13:
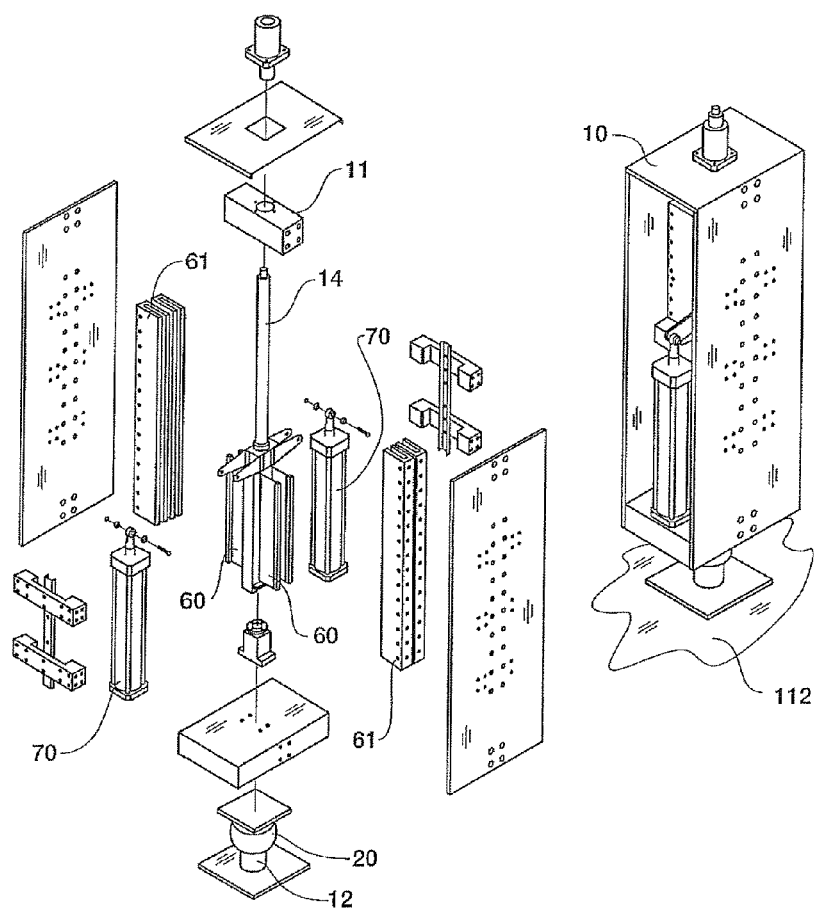
FIG. 13 is an exploded view of the body loader apparatus.

The wheel loader apparatus (see FIG. 13) is a modified version of the body loader apparatus described in the previous section. For the wheel loader apparatus embodiment, the rigid housing 10 is fixedly attached to the inertial reference frame 112 in such a way as to disallow relative angular motion between the wheel loader and the inertial reference frame.

Figure 12:
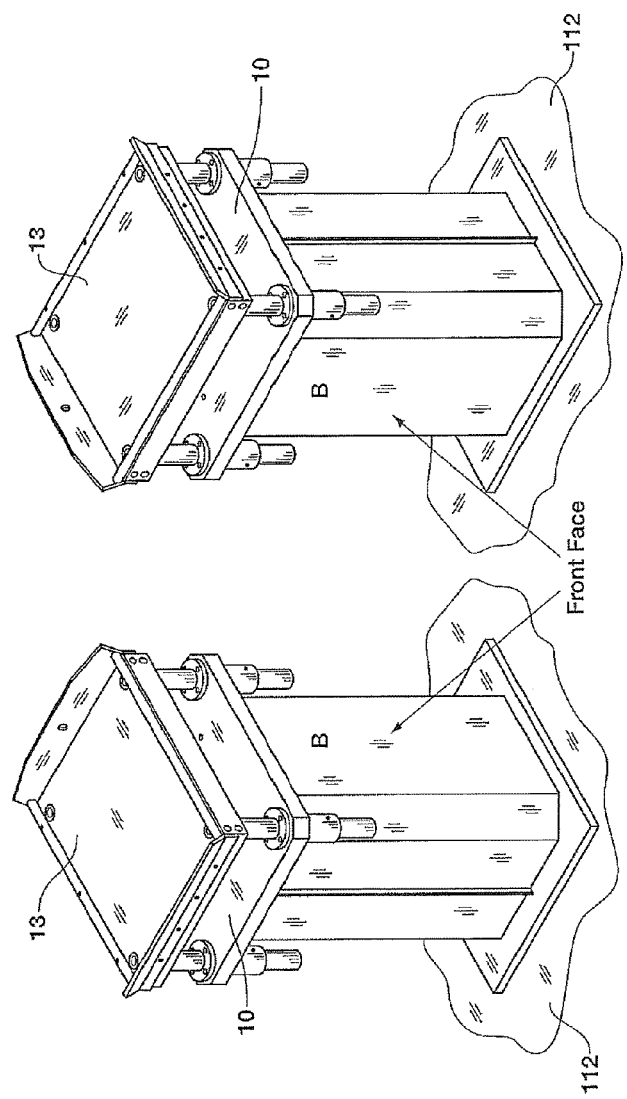
FIG. 12 is side view of the wheel loader apparatus.

In the wheel loader apparatus embodiment seen in FIG. 12, the moving attachment 13 is a flat plate oriented perpendicular to the axis of motion. The moving attachment 13 is fixedly attached to the at least one load cell 30 which in turn is fixedly attached to the moving member 14 such that relative angular motion between the moving attachment 13 and the moving member 14 is disallowed. The flat plate moving attachment 13 is typically referred to as a "wheel-pan" in 4-post, 7-post, and 8-post rigs.

In the wheel loader apparatus embodiment, an acceleration sensing means (not shown in FIG. 1) is fixedly attached to the moving attachment 13. A signal indicative of the acceleration is used to compensate for the inertial forces measured by the at least one force sensing means 30 and caused by motion of the mass of the moving attachment 13. This compensation enables a more accurate measurement of the actual force transmitted to the test object. This compensation is only required when the mass of the moving attachment 13 is significant enough to cause errors in the transmitted force signal 33.

Figure 2:
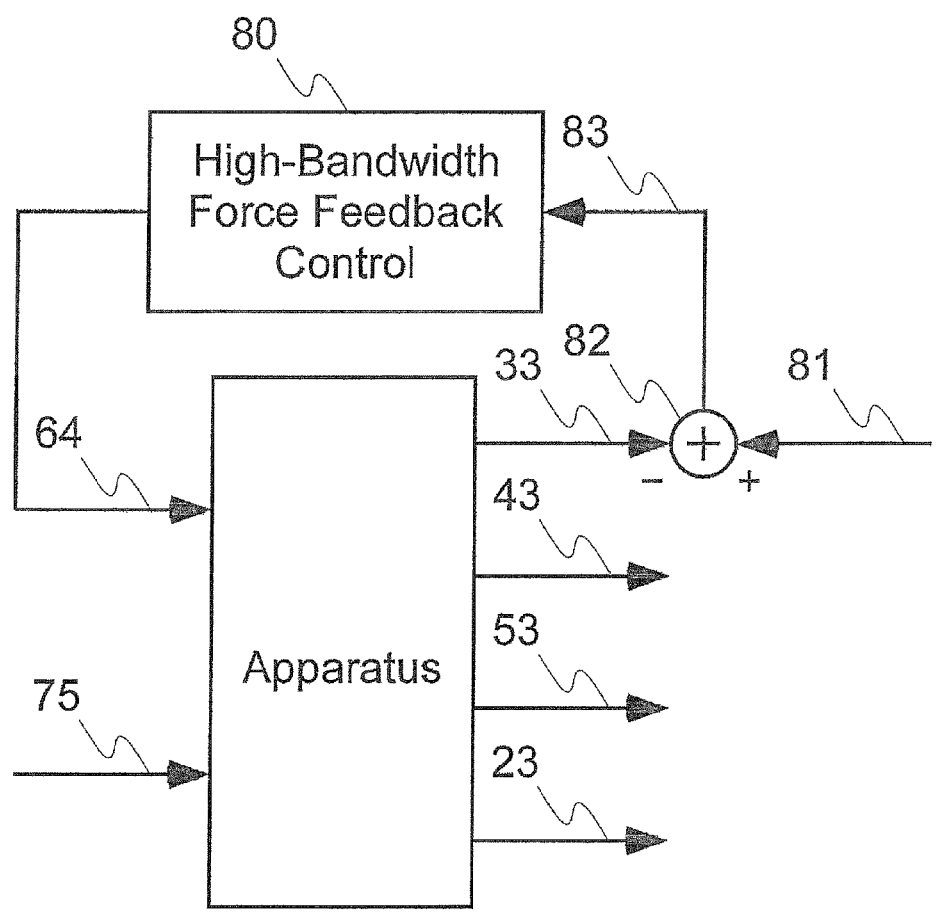
FIG. 2 is a block diagram of a control circuit for the body loader and/or wheel loader.

With respect to FIG. 2, the transmitted force signal 33 from the apparatus is compared to a specified force signal 81 through summing element 82 to produce a first force error 83. The first force error 83 is input to a High-Bandwidth Force Feedback Control operation 80 which generates a command voltage 64 to drive the at least one linear electromagnetic motor within an individual body loader or wheel loader apparatus. The High-Bandwidth Force Feedback Control operation 80 is preferably an integral control action with additional dynamic compensation terms to shape the closed-loop response. Because there is a substantially linear relationship between the command voltage 64 and the transmitted force signal 33, the open-loop dynamics are relatively simple which allows the use of a correspondingly simple High-Bandwidth Force Feedback Control operation 80. The method implementing the circuit of FIG. 2 does not utilize the at least one secondary actuator means 70 to provide static load assist to the at least one linear electromagnetic motor. Although this operational mode increases the likelihood of thermal problems, it still has utility. In another embodiment of FIG. 2, the pneumatic valve associated with the secondary actuator means may be controlled with a manually determined setpoint.

Figure 3:
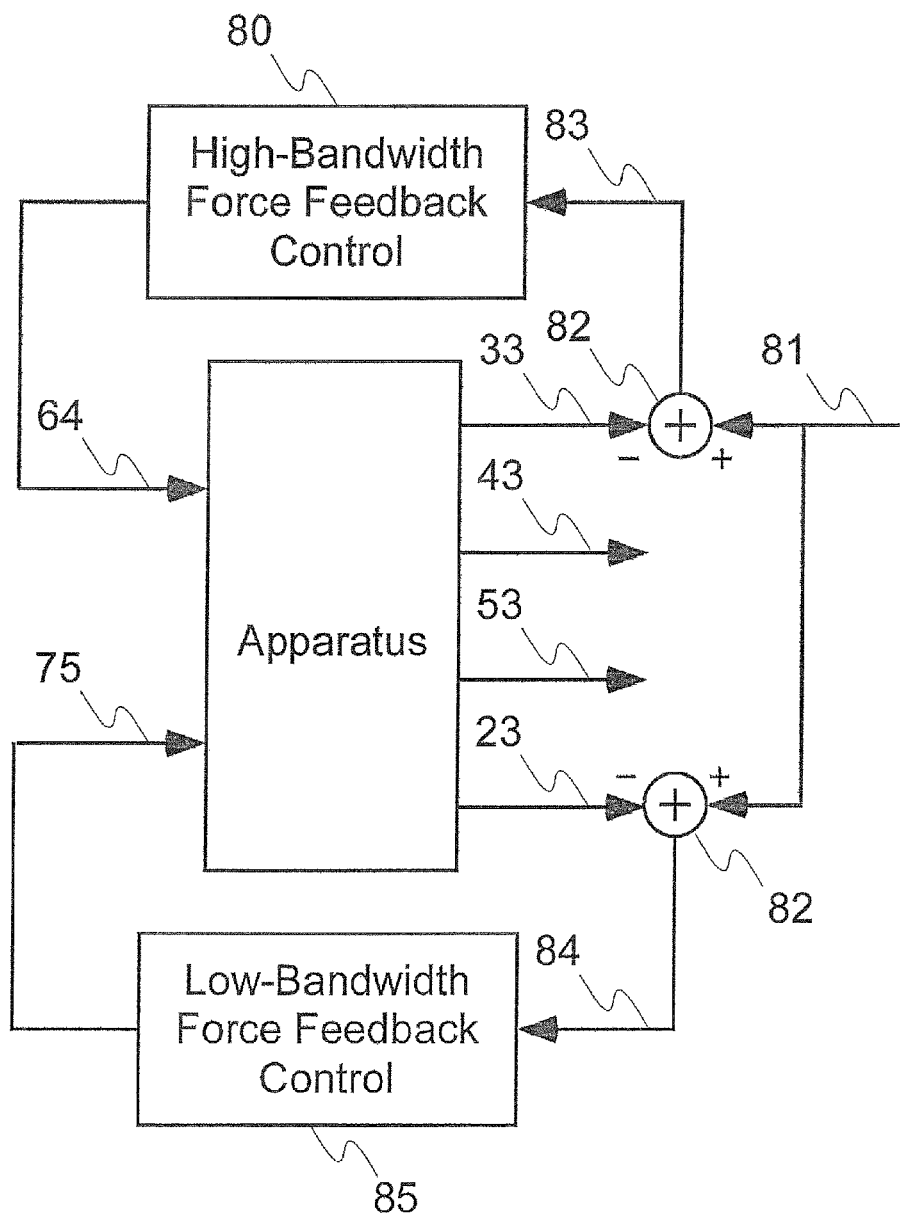
FIGS. 3-7 are block diagrams of alternate control circuits for the body loader and/or wheel loader.
Figure 4:
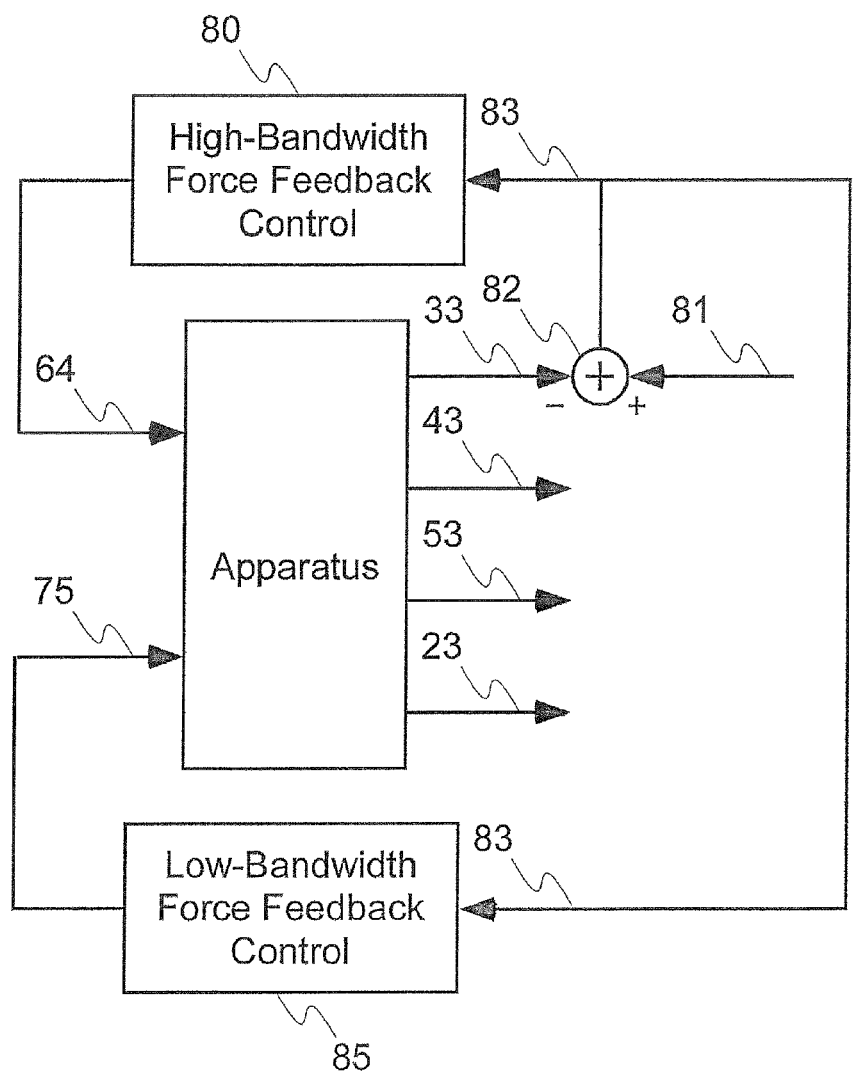
Figure 5:
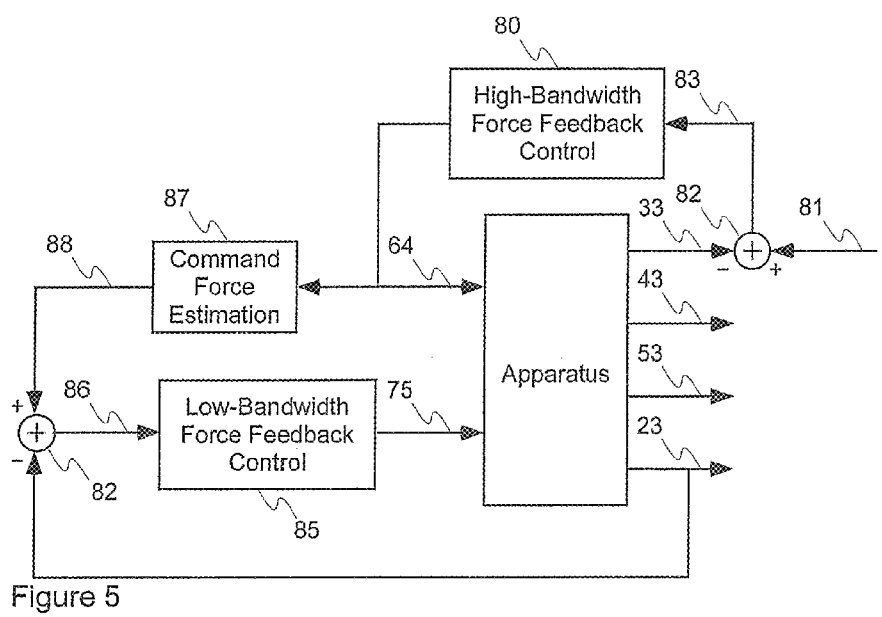

FIG. 3, FIG. 4, and FIG. 5 represent alternate methods for imparting controlled force which do utilize the at least one secondary actuator means 70.

In addition to the High-Bandwidth Force Feedback Control operation 80, the method described by FIG. 3 compares the specified force signal 81 with the secondary transmitted force signal 23 through summing element 82 to produce a second force error 84. The second force error 84 is input to a Low-Bandwidth Force Feedback Control operation 85 which generates a control input 75 to drive the at least one secondary actuation means 70 within an individual body loader or wheel loader apparatus. The Low-Bandwidth Force Feedback Control operation 85 has a restricted bandwidth that limits its operation to control only static loads.

In addition to the High-Bandwidth Force Feedback Control operation 80, the method described by FIG. 4 uses the first force error 83 directly as input to a Low-Bandwidth Force Feedback Control operation 85 which generates a control input 75 to drive the at least one secondary actuation means 70 within an individual body loader or wheel loader apparatus.

A preferred method for imparting controlled force is shown in FIG. 5. In addition to the High-Bandwidth Force Feedback Control operation 80, the method described by FIG. 5 uses the command voltage 64 with a command force estimation operation 87 to generate an estimate of the specified force 88. This approximation provides a significant implementation benefit and is justified because of the substantially linear relationship between the command voltage 64 and the transmitted force signal 33. The command force estimation operation 87 utilizes knowledge of the motor constant, which relates applied current to generated force, and the gain of the power amplifier 63. The estimate of the specified force 88 is then compared to the secondary transmitted force signal 23 through summing element 82 to produce a third force error 86. The third force error 86 is then input to a Low-Bandwidth Force Feedback Control operation 85 which generates a control input 75 to drive the at least one secondary actuation means 70 within an individual body loader or wheel loader apparatus.

In addition to the High-Bandwidth Force Feedback Control operation 80, another preferred method described by FIG. 5 also uses the command voltage 64 with a command force estimation operation 87 to generate an estimate of the specified force 88; however, the estimate of the specified force 88 is then compared to a zero setpoint value (not shown in FIG. 5) through summing element 82 to produce a fourth force error 86. The fourth force error 86 is then input to a Low-Bandwidth Force Feedback Control operation 85 which generates a control input 75 to drive the at least one secondary actuation means 70 within an individual body loader or wheel loader apparatus. This particular embodiment drives the command voltage 64 toward zero, thus shifting the static load to the secondary actuation means 70.

Figure 6:
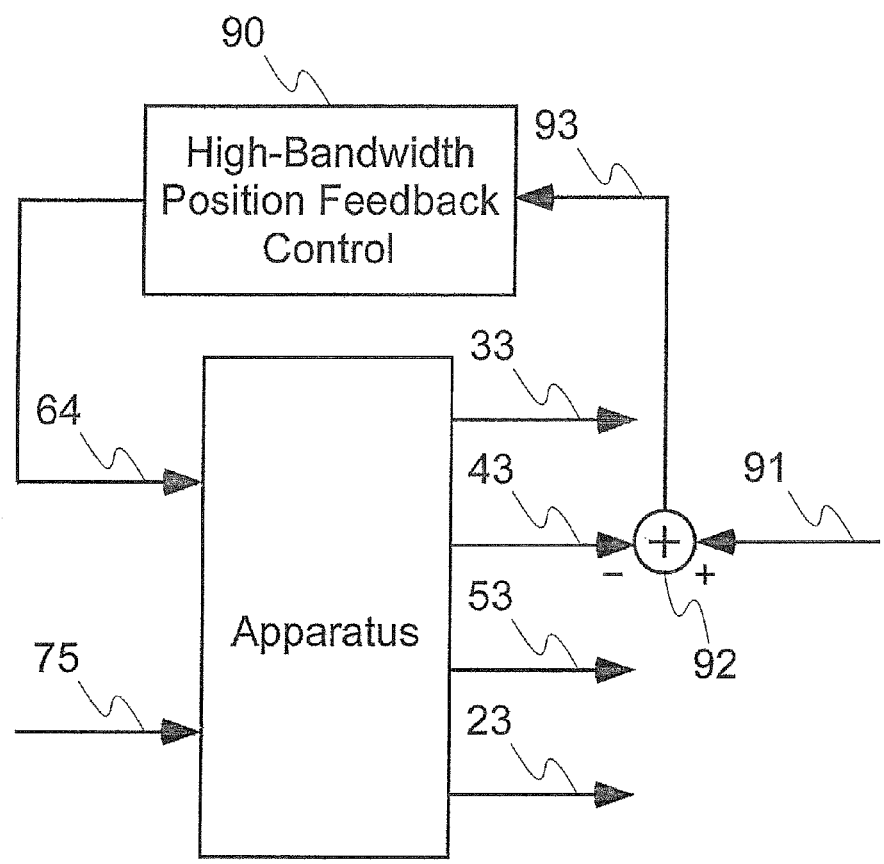

With respect to FIG. 6, the relative displacement signal 43 from the apparatus is compared to a specified displacement signal 91 through summing element 92 to produce a first displacement error 93. The first displacement error 93 is input to a High-Bandwidth Position Feedback Control operation 90 which generates a command voltage 64 to drive the at least one linear electromagnetic motor within an individual body loader or wheel loader apparatus. The High-Bandwidth Position Feedback Control operation 90 is preferably an integral control action with additional dynamic compensation terms to shape the closed-loop response. The method described by FIG. 6 does not utilize the at least one secondary actuator means 70 to provide static load assist to the at least one linear electromagnetic motor. In another embodiment of FIG. 6, the pneumatic valve associated with the secondary actuator means may be controlled with a manually determined setpoint.

Figure 7:
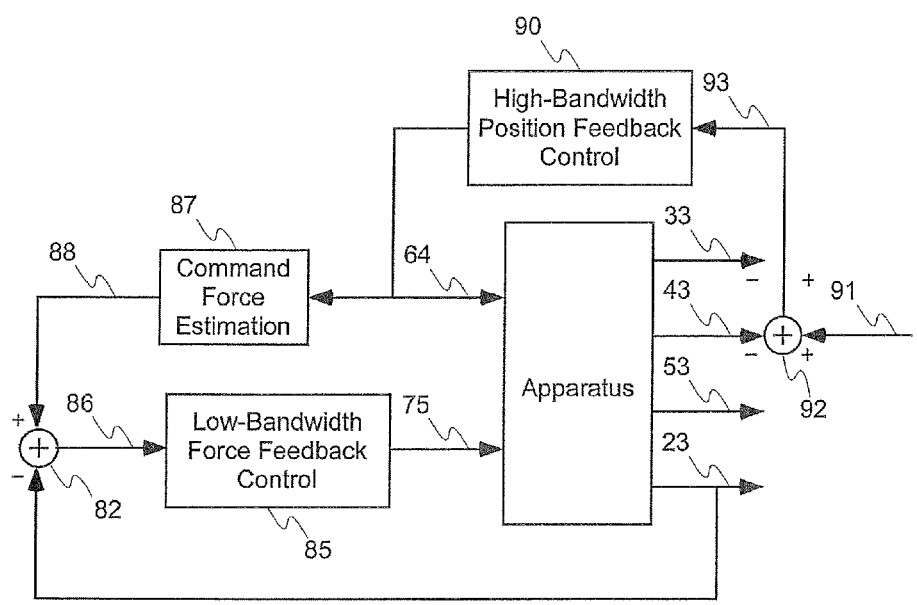

The preferred method for imparting controlled displacement is shown in FIG. 7. In addition to the High-Bandwidth Position Feedback Control operation 90, the method described by FIG. 7 uses the command voltage 64 with a command force estimation operation 87 to generate an estimate of the specified force 88. This approximation provides a significant implementation benefit and is justified because of the substantially linear relationship between the command voltage 64 and the transmitted force signal 33. The command force estimation operation 87 utilizes knowledge of the motor constant, which relates applied current to generated force, and the gain of power amplifier 63. The estimate of the specified force 88 is then compared to the secondary transmitted force signal 23 through summing element 82 to produce a third force error 86. The third force error 86 is then input to a Low-Bandwidth Force Feedback Control operation 85 which generates a control input 75 to drive the at least one secondary actuation means 70 within an individual body loader or wheel loader apparatus.

In addition to the High-Bandwidth Position Feedback Control operation 80, another method described by FIG. 7 also uses the command voltage 64 with a command force estimation operation 87 to generate an estimate of the specified force 88; however, the estimate of the specified force 88 is then compared to a zero setpoint value (not shown in FIG. 7) through summing element 82 to produce a fourth force error 86. The fourth force error 86 is then input to a Low-Bandwidth Force Feedback Control operation 85 which generates a control input 75 to drive the at least one secondary actuation means 70 within an individual body loader or wheel loader apparatus. This particular embodiment drives the command voltage 64 toward zero, thus shifting the static load to the secondary actuation means 70.

Linear electromagnetic motor coils are subject to relatively rapid resistive heating whenever a sustained DC current is applied, such as when specified to apply a static force. One method for regulating the temperature of the linear electromagnetic motor coil is to enable, disable, or otherwise control the at least one cooling means 77 in response to the coil temperature signal 53. The decision to enable, disable, or otherwise control the at least one cooling means 77 can be performed by an automatic controller or by a human operator monitoring the coil temperature signal 53. Another method for regulating the temperature of the linear electromagnetic motor coil is to disable or completely shut down the associated at least one power amplifier 63 in response to the coil temperature signal 53. This approach is intended to be a failsafe operation to prevent overheating.

Another method for regulating the temperature of the linear electromagnetic motor coil is to enable the at least one secondary actuation means 70 in response to the coil temperature signal 53. This approach allows the at least one secondary actuation means 70 to apply a significant portion of the static load to the test object, thus relieving the linear electromagnetic motor from this requirement.

One method for insuring safe operation is to disable or completely shut down all power amplifiers 63 in the event that an unsafe condition has been identified. Unsafe events may include, but are not limited to at least one of: displacement out of range, velocity out of range, acceleration out of range, force out of range, and temperature out of range. The overall control system needs to be able to shut down the apparatus and the apparatus needs to be able to shut down the overall control system.

A method is required for preventing impulsive startup conditions when the apparatus is used to impart a controlled force or when the apparatus is used to impart a controlled displacement.

One method for preventing impulsive startup conditions is to first set the initial specified force signal 81 (or the initial specified displacement signal 91) to be identical to the transmitted force signal 33 (or the relative displacement signal 43). This will cause the initial first force error 83 (or the initial first displacement error 93) to be zero, thereby causing the high bandwidth feedback controller output to be zero. Next, the power amplifiers 63 are enabled, and finally, the initial specified force signal 81 (or the initial specified displacement signal 91) is linearly ramped to the actual desired or specified force signal 81 (or the actual desired or specified displacement signal 91).

An alternative method is to hold the initial first force error 83 (or the initial first displacement error 93) to be zero, then enable the power amplifiers 63, and finally limit the rate at which the first force error 83 (or the first displacement error 93) is allowed to reach its initial steady-state level.

In the case where the mass of the moving attachment 13 is significant, as in a wheelpan for a wheel loader, inertial compensation is required to obtain a more accurate transmitted force. In this case, the transmitted force signal 33 contains two components. The first component is the actual force transmitted to the test object. The second component is an inertial force caused by accelerating the mass of the moving attachment 13. This second component is the term that distorts the transmitted force signal 33, and must be removed. Mathematically, this relationship can be expressed using Newton's second law of motion as:

$$F\text{meas} = F\text{transmitted} + (M\text{attachment} \times A\text{attachment}) \qquad (1)$$

Where Fmeas is the Transmitted Force signal 33 as measured by Force Sensing means 30

Ftransmitted is the Actual force transmitted to the test object

M attachment is the Mass of the moving attachment 13 and

A attachment is the Acceleration of the moving attachment 13

Notice that if the mass of the moving attachment 13 is relatively small or zero, the transmitted force signal 33 is equal to the actual force transmitted to the test object. For a variety of practical reasons including higher order vibrational modes of the mass and dynamic filters applied to the measured force and acceleration signals, the inertial term in equation (1) is often not an accurate representation of a real dynamic system implementation. The preferred method for inertial compensation of transmitted force signal begins with the step of removing the test object from the apparatus thereby causing Ftransmitted to be zero. The next step is to command the apparatus with an excitation signal that covers the operating frequency range of the testing.

The excitation signal, which would typically be a specified displacement signal 91, can be a random noise signal or a swept sine signal. During the excitation step, both the transmitted force signal 33 and the acceleration of the moving attachment 13 are recorded. The next step in the inertial compensation method is to construct a dynamic filter to represent the transfer function between the transmitted force signal 33 as a response, and the acceleration of the moving attachment 13 as an excitation. This transfer function can be expressed by the complex frequency domain representation of equation (2):

$$m(f) = \frac{Ftransmitted\ (f)}{aattachment\ (f)} \qquad (2)$$

where f represents the frequency. There are many available well-known techniques for constructing a suitable dynamic filter from the input-output data. One preferred approach is to compute a complex frequency response function in the frequency domain and then fit the resulting complex data with an infinite impulse response filter. The infinite impulse response filter will become the required dynamic filter. When the measured acceleration data is input to the infinite impulse response filter, the output of the filter is a more accurate prediction of the inertial force which can then be subtracted from the transmitted force signal 33 to generate a more accurate estimate of the actual force transmitted to the test object.

Another preferred approach is to design a finite impulse response filter using the measured force and acceleration data. There are many available well-known techniques for determining the coefficients of a finite impulse response filter to represent the dynamics between the input measured acceleration data and the output measured force data. Such techniques include gradient-descent search algorithms such as Least-Mean-Squares, or conventional optimization algorithms.

Embodiments of the invention described by this disclosure also include a method for incorporating a plurality of apparatus elements. There are many possible combinations such as: a 2-post quarter car rig with one wheel loader and one body loader; a 4-post vehicle shaker rig with four wheel loaders; a 7-post vehicle shaker rig with four wheel loaders and three body loaders; and an 8-post vehicle shaker rig with four wheel loaders and four body loaders.

Figure 8:
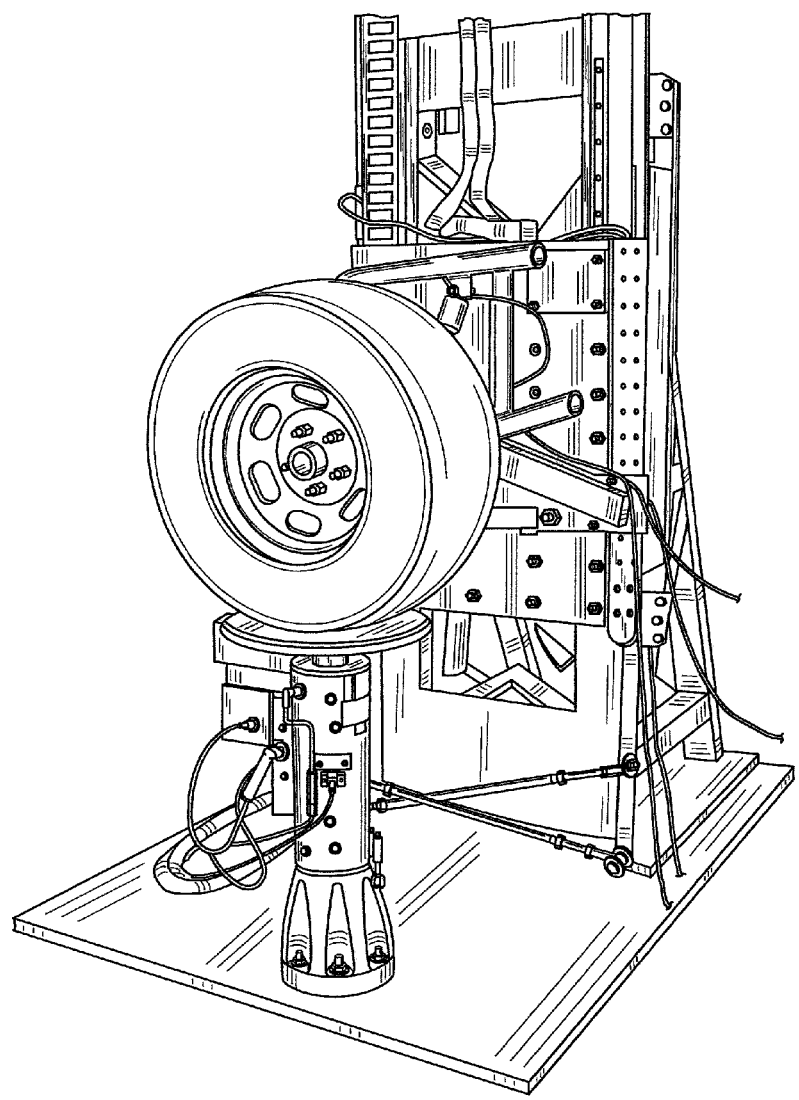
FIG. 8 is a perspective side view of a quarter-car test rig incorporating linear electromagnetic motor technology as body loader actuators.
Figure 9:
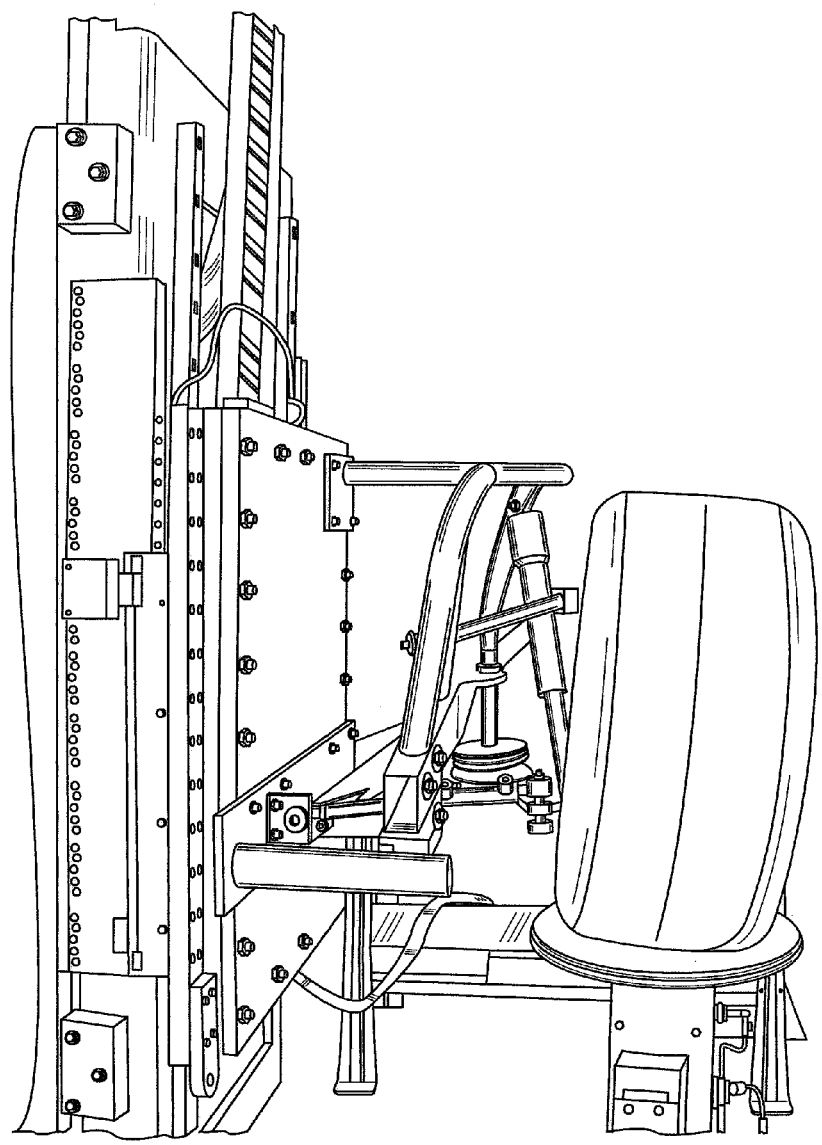
FIG. 9 is a perspective end view of a quarter-car test rig incorporating linear electromagnetic motor technology as body loader actuators.

FIG. 8 and FIG. 9 are photographs of a fully functional quarter-car test rig incorporating linear electromagnetic motor technology as body loader actuators with a hydraulic wheel loader. The quarter-car test rig utilizes two separate linear electromagnetic motors, one on each side of the sprung mass plate which is constrained to move vertically on two precision bearing rails. The left hand side of FIG. 9 shows one linear electromagnetic motor attached to the left side of the quarter-car. The U-shaped permanent magnet track (silver object) is attached to the rigid frame, and the coil element is attached to the moving sprung mass plate. FIG. 9 also shows a linear encoder that is used to sense the relative displacement. The quarter car rig in FIG. 8 and FIG. 9 does not include a secondary actuation means 70 as described above.

Figure 10:
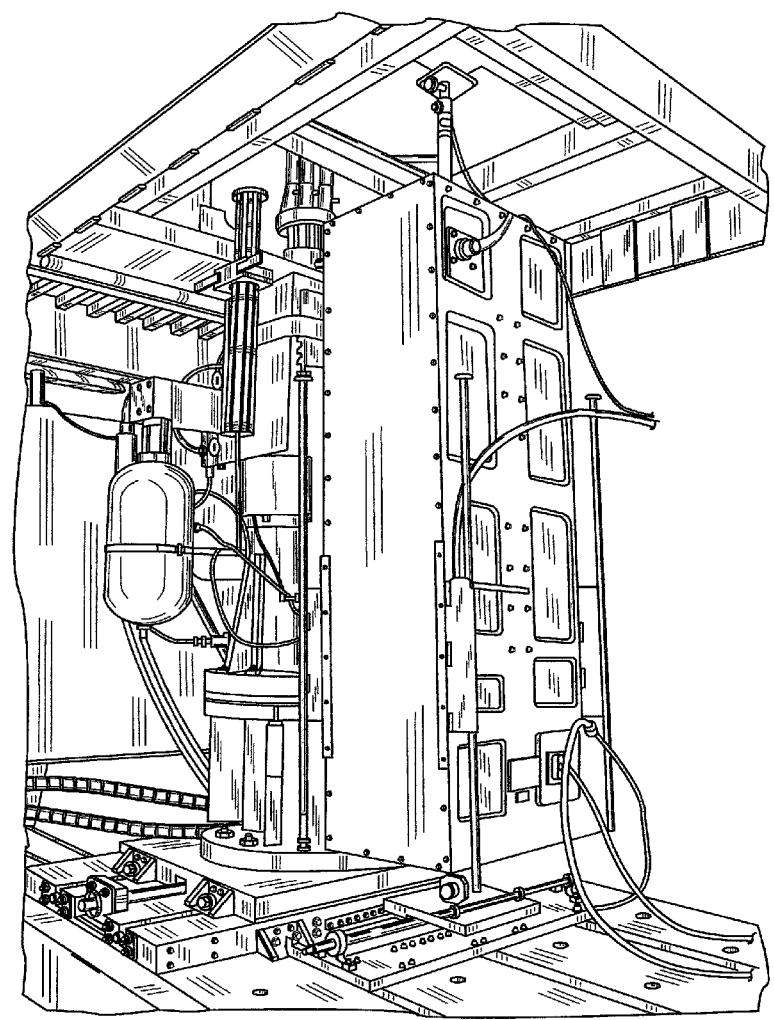
FIG. 10 is a perspective side view of linear electromagnetic motor body loaders installed on an 8-post vehicle shaker rig.

FIG. 10 is a photograph of a body loader incorporating linear electromagnetic motors and a pneumatic cylinder and piston assembly installed on an 8-post vehicle shaker rig. Only one body loader is clearly visible in this photograph (center of image) although four are actually installed in the depicted 8-post rig. A hydraulic wheel loader is also shown in FIG. 10 behind the body loader. Working from the top to the bottom of the body loader in FIG. 10, the photograph clearly shows the moving attachment means 13, the at least one force sensing means 30, the shaft of the moving member 14, the rigid housing 10, the installation support means 15, and the manual input means 76.

The EMA series, in its basic configuration, is very efficient at reproducing dynamic motions. With frequency response well above many servo hydraulic systems, the EMA is well suited for applications that need high dynamic force along with high velocities or accelerations. But for applications that also require supporting a static mean load, such as vibration work on larger test objects or testing many suspension components, vehicle subassemblies, or even entire vehicles, the EMA can be combined with a pneumatic preload system to enhance its capabilities. This option is called Static Air Assist (SAA).

The SAA system consists of relatively low tech devices, with low frequency response, by design. It is capable of supporting higher static loads without affecting the dynamic performance of the linear electromagnetic motors. SAA also consumes very little energy, as it essentially only uses energy upon system startup. Once energized, the pneumatic pressure is constant and doesn't require additional energy unless test parameters are changed. When de-energized, the system gradually releases the stored energy, resulting in a controlled shutdown.

The SAA option also takes advantage of readily available shop air at 80 psi or less. In the event shop air is not available, or excess capacity does not exist, a standard air compressor can be added.

Until now, the excellent performance of the EMA linear electromagnetic motors have been limited to use in specific testing applications. Now, with the addition of the Static Air Assist, the EMA series can be applied to a wider testing market, which require significant mean loads relative to the dynamic performance.

The Static Air Assist option can be added to existing systems, and in no way diminishes the dynamic performance of the EMA linear electromagnetic motors. In fact, as the SAA eliminates mean loads, more EMA performance is available for use in dynamic motion, thereby enhancing existing performance.

This combination of functionality provides the test engineer with an efficient, clean, compact, and high response system.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A method of improving the accuracy of a measured dynamic transmitted force in an apparatus which imparts motion to a test object in a controlled fashion by applying a force to the test object, comprising the steps of:

measuring acceleration of a movable test object and generating a signal indicative of the measured acceleration of the movable test object and transmitting the signal indicative of the acceleration of the movable test object;

filtering said signal indicative of the measured acceleration of the movable test object in a dynamic filter tuned to dynamic characteristics of the apparatus to generate a dynamic compensation force signal;

adding the dynamic compensation force signal to a signal indicative of the force applied to the test object to generate a compensated dynamic transmitted force signal.

2. The method as claimed in claim 1, wherein said dynamic filter is a digital finite impulse response filter.

3. The method as claimed in claim 2 wherein the digital finite impulse response filter represents dynamics between an input measured acceleration data and output measured force data using a gradient-descent search algorithm.

4. The method as claimed in claim 1 wherein the dynamic filter is a moving average filter.

5. The method as claimed in claim 1 wherein the dynamic filter includes a transfer function between the force applied to the test object as a response, and the measured acceleration of the test object as an excitation.

* * * * *